(12) United States Patent
Pfaff et al.

(10) Patent No.: US 11,115,682 B2
(45) Date of Patent: Sep. 7, 2021

(54) BLOCK-BASED PREDICTIVE CODING AND DECODING OF A PICTURE

(71) Applicant: Fraunhofer-Gesellschaft zur Foerderung der angewandten Forschung e.V., Munich (DE)

(72) Inventors: Jonathan Pfaff, Berlin (DE); Martin Winken, Berlin (DE); Christian Rudat, Berlin (DE); Heiko Schwarz, Berlin (DE); Thomas Wiegand, Berlin (DE); Detlev Marpe, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/503,004

(22) Filed: Jul. 3, 2019

(65) Prior Publication Data

US 2019/0327492 A1     Oct. 24, 2019

Related U.S. Application Data

(63) Continuation of application No. PCT/EP2017/083789, filed on Dec. 20, 2017.

(30) Foreign Application Priority Data

Jan. 5, 2017     (EP) ..................... 17150454

(51) Int. Cl.
*H04N 19/65*     (2014.01)
*H04N 19/13*     (2014.01)
(Continued)

(52) U.S. Cl.
CPC ........... *H04N 19/65* (2014.11); *H04L 65/607* (2013.01); *H04L 65/80* (2013.01); *H04N 19/13* (2014.11); *H04N 19/176* (2014.11); *H04N 19/60* (2014.11)

(58) Field of Classification Search
CPC ...... H04N 19/13; H04N 19/60; H04N 19/176; H04N 19/82; H04N 19/65; H04N 19/48; H04L 65/607; H04L 65/80
See application file for complete search history.

(56) References Cited

U.S. PATENT DOCUMENTS

2009/0080798 A1     3/2009   Maurer et al.
2011/0228843 A1     9/2011   Narroschke et al.
(Continued)

FOREIGN PATENT DOCUMENTS

EP            2192786 A1       6/2010
KR         20110093811 A       8/2011

*Primary Examiner* — Neil R Mikeska
(74) *Attorney, Agent, or Firm* — Perkins Cole LLP; Michael A. Glenn

(57)     ABSTRACT

A previously encoded or reconstructed version of a neighborhood of a predetermined block to be predicted is exploited so as to result into a more efficient predictive coding of the prediction block. In particular, a spectral decomposition of a region composed of this neighborhood and a first version of a predicted filling of the predetermined block results into a first spectrum which is subject to noise reduction and the thus resulting second spectrum may be subject to a spectral composition, thereby resulting in a modified version of this region including a second version of the predicted filling of the predetermined block. Owing to the exploitation of the already processed, i.e. encoded/reconstructed, neighborhood of the predetermined block, the second version of the predicted filling of the predetermined block tends to improve the coding efficiency.

57 Claims, 5 Drawing Sheets

(51) Int. Cl.
*H04N 19/176* (2014.01)
*H04N 19/60* (2014.01)
*H04L 29/06* (2006.01)

(56) References Cited

U.S. PATENT DOCUMENTS

| | | | |
|---|---|---|---|
| 2015/0016523 A1* | 1/2015 | Puri | H04N 19/31 |
| | | | 375/240.12 |
| 2016/0014430 A1 | 1/2016 | Hinz et al. | |
| 2018/0176592 A1* | 6/2018 | Lim | H04N 19/513 |
| 2019/0110061 A1* | 4/2019 | Park | H04N 19/103 |

* cited by examiner

BLOCK-BASED PREDICTIVE CODING AND DECODING OF A PICTURE

CROSS-REFERENCES TO RELATED APPLICATIONS

This application is a continuation of copending International Application No. PCT/EP2017/083789, filed Dec. 20, 2017, which is incorporated herein by reference in its entirety, and additionally claims priority from European Application No. EP 17 150 454.1, filed Jan. 5, 2017, which is incorporated herein by reference in its entirety.

The present application is concerned with block-based predictive coding and decoding of pictures such as applicable in hybrid video codecs, for example.

BACKGROUND OF THE INVENTION

Nowadays many video codecs and still picture codecs use block-based predictive coding to compress the data used to represent the picture content. The better the prediction is, the lower the data needed to code the prediction residual. The overall benefit from using prediction depends on the amount of data needed to keep the prediction synchronized between encoder and decoder, i.e. the data needed for prediction parameterization.

SUMMARY

According to an embodiment, an apparatus for block-based predictive decoding of a picture may have: a prediction provider configured to predict a predetermined block of the picture to acquire a first version of a predicted filling of the predetermined block; a spectral decomposer configured to spectrally decompose a region composed of the first version of the predicted filling of the predetermined block and a reconstructed version of a neighborhood of the predetermined block so as to acquire a first spectrum of the region; a noise reducer configured to perform noise reduction on the first spectrum to acquire a second spectrum; a spectral composer configured to subject the second spectrum to spectral composition so as to acquire a modified version of the region including a second version of the predicted filling of the predetermined block; a reconstructor configured to decode a reconstructed version of the predetermined block from a data stream on the basis of the second version of the predicted filling.

According to another embodiment, an apparatus for block-based predictive encoding of a picture may have: a prediction provider configured to predict a predetermined block of the picture to acquire a first version of a predicted filling of the predetermined block; a spectral decomposer configured to spectrally decompose a region composed of the first version of the predicted filling of the predetermined block and a previously encoded version of a neighborhood of the predetermined block so as to acquire a first spectrum of the region; a noise reducer configured to perform noise reduction on the first spectrum to acquire a second spectrum; a spectral composer configured to subject the second spectrum to spectral composition so as to acquire a modified version of the region including a second version of the predicted filling of the predetermined block; an encoding stage configured to encode the predetermined block into a data stream on the basis of the second version of the predicted filling.

According to another embodiment, a method for block-based predictive decoding of a picture may have the steps of: predicting a predetermined block of the picture to acquire a first version of a predicted filling of the predetermined block; spectrally decomposing a region composed of the first version of the predicted filling of the predetermined block and a reconstructed version of a neighborhood of the predetermined block so as to acquire a first spectrum of the region; performing noise reduction on the first spectrum to acquire a second spectrum; subjecting the second spectrum to spectral composition so as to acquire a modified version of the region including a second version of the predicted filling of the predetermined block; decoding a reconstructed version of the predetermined block from a data stream on the basis of the second version of the predicted filling.

According to another embodiment, a method for block-based predictive encoding of a picture may have the steps of: predicting a predetermined block of the picture to acquire a first version of a predicted filling of the predetermined block; spectrally decomposing a region composed of the first version of the predicted filling of the predetermined block and a previously encoded version of a neighborhood of the predetermined block so as to acquire a first spectrum of the region; performing noise reduction on the first spectrum to acquire a second spectrum; subjecting the second spectrum to spectral composition so as to acquire a modified version of the region including a second version of the predicted filling of the predetermined block; encoding the predetermined block into a data stream on the basis of the second version of the predicted filling.

Another embodiment may have a non-transitory digital storage medium having a computer program stored thereon to perform the method for block-based predictive decoding of a picture, the method including: predicting a predetermined block of the picture to acquire a first version of a predicted filling of the predetermined block; spectrally decomposing a region composed of the first version of the predicted filling of the predetermined block and a reconstructed version of a neighborhood of the predetermined block so as to acquire a first spectrum of the region; performing noise reduction on the first spectrum to acquire a second spectrum; subjecting the second spectrum to spectral composition so as to acquire a modified version of the region including a second version of the predicted filling of the predetermined block; decoding a reconstructed version of the predetermined block from a data stream on the basis of the second version of the predicted filling, when said computer program is run by a computer Another embodiment may have a non-transitory digital storage medium having a computer program stored thereon to perform the method for block-based predictive encoding of a picture, the method including: predicting a predetermined block of the picture to acquire a first version of a predicted filling of the predetermined block; spectrally decomposing a region composed of the first version of the predicted filling of the predetermined block and a previously encoded version of a neighborhood of the predetermined block so as to acquire a first spectrum of the region; performing noise reduction on the first spectrum to acquire a second spectrum; subjecting the second spectrum to spectral composition so as to acquire a modified version of the region including a second version of the predicted filling of the predetermined block; encoding the predetermined block into a data stream on the basis of the second version of the predicted filling, when said computer program is run by a computer.

Another embodiment may have a data stream having a picture encoded thereinto, the data stream being generated by an inventive method.

It is a basic finding of the present application that a previously encoded or reconstructed version of a neighborhood of a predetermined block to be predicted may be exploited so as to result into a more efficient predictive coding of the prediction block. In particular, a spectral decomposition of a region composed of this neighborhood and a first version of a predicted filling of the predetermined block results into a first spectrum which is subject to noise reduction and the thus resulting second spectrum may be subject to a spectral composition, thereby resulting in a modified version of this region including a second version of the predicted filling of the predetermined block. Owing to the exploitation of the already processed, i.e. encoded/reconstructed, neighborhood of the predetermined block, the second version of the predicted filling of the predetermined block tends to improve the coding efficiency.

In accordance with embodiments of the present application, a first signalization may be spent in the data stream so as to select between using the first version of the predicted filling and the second version of the predicted filling. Despite the additional data amount needed for this first signalization, the capability to select between the first version and the second version of the predicted filling may improve the coding efficiency. The first signalization may be conveyed within the data stream at sub-picture granularity so that the selection between the first and second versions may take place at the sub-picture granularity.

Likewise, additionally or alternatively, a second signalization may be spent in the data stream in accordance with a further embodiment of the present application, the second signalization being used to set a size of the neighborhood used to extend the predetermined block and form the region with respect to which the spectral decomposition, noise reduction and spectral composition is performed. The second signalization may be conveyed within the data stream in a manner varying at sub-picture granularity, too.

And even further, additionally or alternatively, a further signalization may be conveyed within the data stream, the third signalization signaling a strength of the noise reduction such as, for example, by indicating a threshold to be applied onto the first spectrum resulting from the spectral decomposition. The third signalization may be conveyed within the data stream in a manner varying at sub-picture granularity, too.

First, second and/or third signalizations may be coded in the data stream using spatial prediction and/or using entropy coding using a spatial context, i.e. using a probability distribution estimate for the possible signalization values which depends on a spatial neighborhood of the region for which the respective signalization is contained in the data stream.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
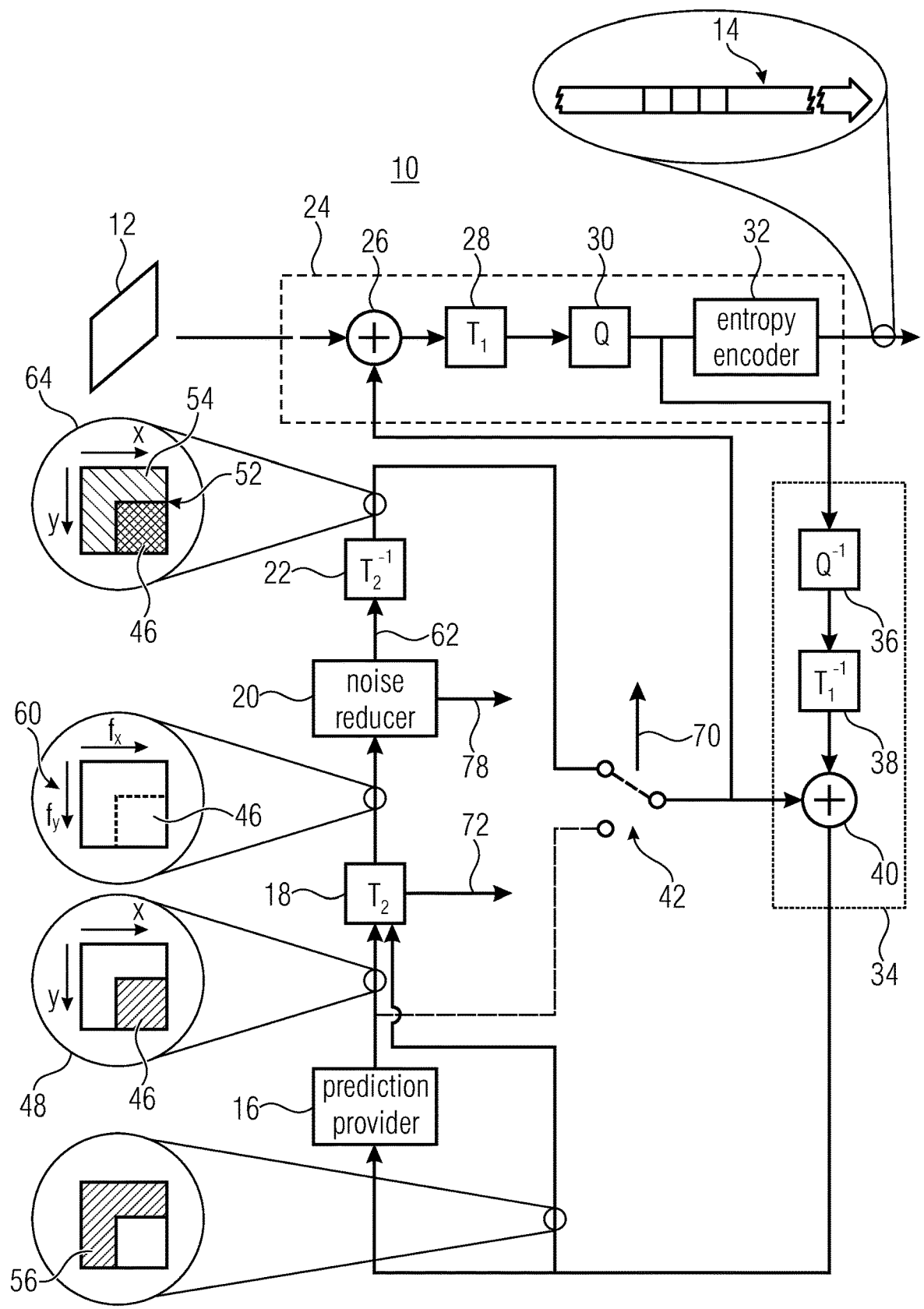
FIG. 1 shows a block diagram of an encoding apparatus in accordance with an embodiment of the present application.

FIG. 1 shows an apparatus 10 for block-based predictive encoding of a picture 12 into a data stream 14. The apparatus of FIG. 1 comprises a prediction provider 16, a spectral decomposer 18, a noise reducer 20, a spectral composer 22 and an encoding stage 24. In a manner outlined in more detail below, these components 16 to 24 are serially connected into a prediction loop of encoder 10 in the order of their mentioning. For illustration purposes, FIG. 1 indicates that, internally, the encoding stage 24 may comprise an adder 26, a transformer 28 and a quantization stage 30 serially connected in the aforementioned prediction loop along the order of their mentioning. In particular, an inverting input of adder 26 is connected to an output of spectral composer 22, either directly or indirectly via a selector as further outlined below, while a non-inverting input of adder 26 receives the signal to be encoded, i.e. picture 12. As further indicated in FIG. 1, encoding stage 24 may further comprise an entropy encoder 32 connected between the output of quantizer 30 and an output of apparatus 10 at which the coded data stream 14 representing picture 12 is output. As further illustrated in FIG. 1, apparatus 10 may comprise, connected between encoding stage 24 and prediction provider 16 along the aforementioned prediction loop, a reconstruction stage 34 which provides to the prediction provider 16 previously encoded portions, i.e. portions of picture 12 or a video to which picture 12 belongs, which have previously been encoded by encoder 10, and in particular, a version of these portions which is reconstructable at the decoder side even taking the coding loss into account introduced by the quantization within quantization stage 30. As illustrated in FIG. 1, the reconstruction stage 34 may comprise a dequantizer 36, an inverse transformer 38 and an adder 40 sequentially connected into the aforementioned prediction loop in the order of their mentioning, wherein the dequantizer's input is connected to the quantizer's output. In particular, an output of adder 40 is connected to an input of prediction provider 16 and, additionally, a further input of spectral decomposer 18, present in addition to an input of spectral decomposer 18 connected to the output of prediction provider 16 as outlined in more detail below. While a first input of adder 40 is connected to the output of inverse transformer 38, a further input of adder 40 receives, directly or—optionally—indirectly, a final prediction signal via the output of spectral composer 22. As depicted in FIG. 1, optionally, encoder 10 comprises a selector 42 configured to select between applying the prediction signal output by spectral composer 22 to the respective input of adder 40, or the output of prediction provider 16.

After having explained the internal structure of encoder 10, it should be noted that the implementation of encoder 10 may be done in software, firmware or hardware or any combination thereof. Any block or module shown in FIG. 1 may, accordingly, correspond to a certain portion of a computer program running on a computer, a certain portion of a firmware such as a field programmable array, or a certain portion of an electronic circuit such as an application-specific IC.

Figure 2:
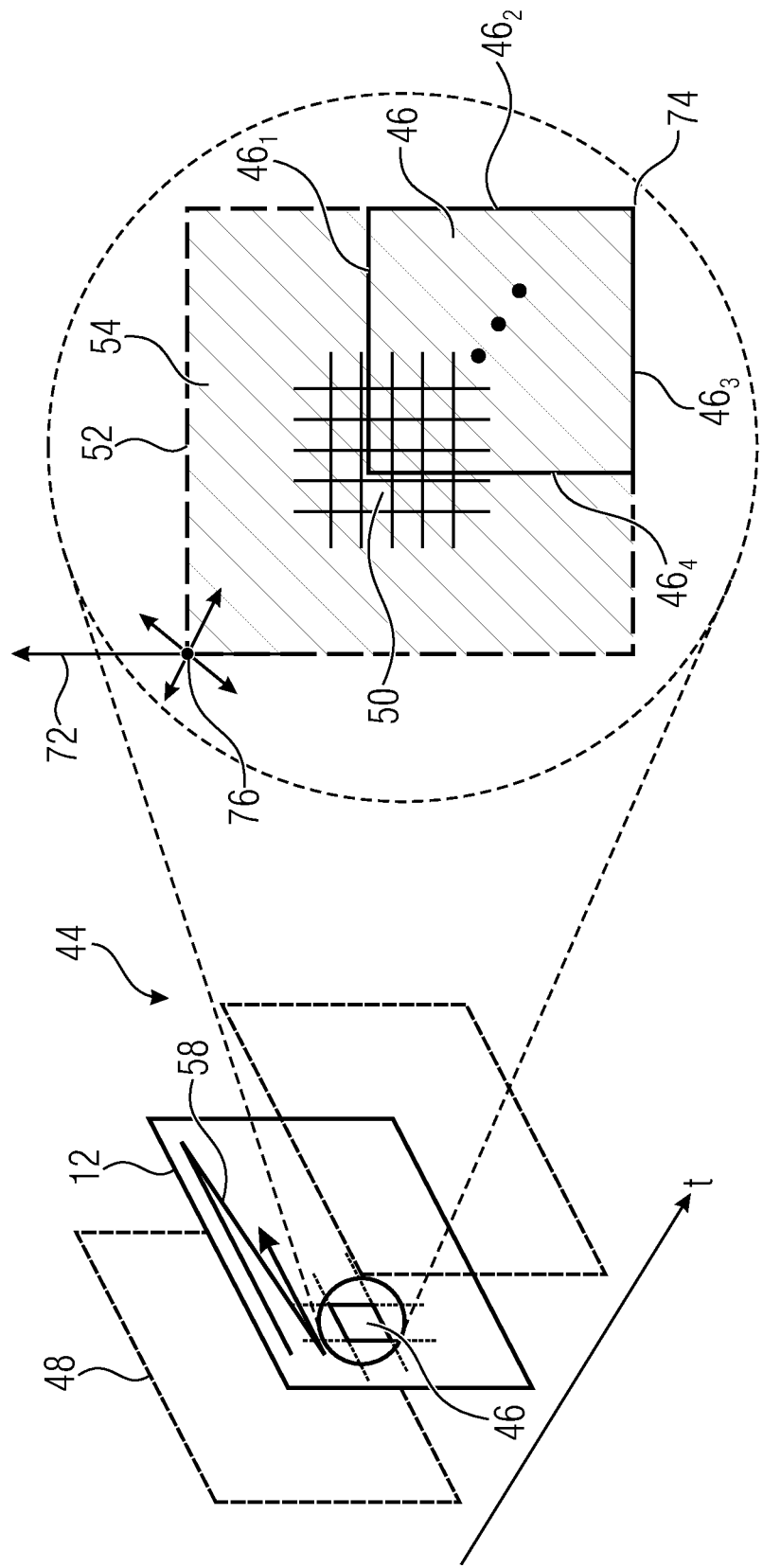
FIG. 2 shows a schematic diagram illustrating the picture which contains blocks to be predicted with illustrating at the right-hand side for a block currently to be predicted, as to how same is extended so as to result into a region which is then the starting point for achieving the alternative version of a predicted filling for this block, in accordance with an embodiment.

The apparatus 10 of FIG. 1 is configured to encode picture 12 into data stream 14 using block-based prediction. Accordingly, on this block-basis, prediction provider 16 and the subsequent modules 18, 20 and 22, operate. Block 46 in FIG. 2 is such a prediction block. However, apparatus 10 may operate on a block-basis also with respect to other tasks. For instance, the residual encoding performed by encoding stage 24 may be performed also on a block-basis. However, prediction blocks which prediction provider 16 operates on, may differ from residual blocks in units of which encoding stage 24 operates. That is, picture 12 may be subdivided into prediction blocks differently than its subdivision into residual blocks. For example, but not exclusively, the subdivision into residual blocks may represent an extension of the subdivision into prediction blocks so that each residual block is either a fraction of a corresponding prediction block, or coincides with a certain prediction block, but does not overlay to neighboring prediction blocks. Moreover, prediction provider 16 may use different coding modes in order to perform its prediction and the switching between these modes may take place in blocks which might be called coding blocks, which may also differ from prediction blocks and/or residual blocks. For example, the subdivision of picture 12 into coding blocks may be such that each prediction block merely overlays one corresponding coding block, but may be smaller than this corresponding coding block. The coding modes just mentioned may include spatial prediction modes and temporal prediction modes.

In order to explain the functionality or mode of operation of apparatus 10 further, reference is made to FIG. 2 which illustrates that picture 12 might be a picture belonging to a video, i.e. may be one picture out of a temporal sequence of pictures 44, but it should be noted that this is merely an illustration and apparatus 10 may also be applicable to still pictures 12. FIG. 2 specifically indicates one prediction block 46 within picture 12. This prediction block shall be the block for which prediction provider 16 is currently to perform a prediction. In order to predict block 46, prediction provider 16 uses previously encoded portions of picture 12 and/or video 44 or, alternatively speaking, portions which are already reconstructable for the decoder from the data stream 14 when trying to perform the same prediction for block 46. To this end, prediction provider 16 uses the reconstructable version, i.e. the version also reconstructable at the decoder side. Different coding modes are available. For instance, prediction provider 16 may predict block 46 by way of temporal prediction such as motion-compensated prediction on the basis of a reference picture 48. Alternatively, prediction provider 16 may predict block 46 using spatial prediction. For instance, prediction provider 16 may extrapolate a previously encoded neighborhood of block 46 into the inner of block 46 along a certain extrapolation direction. In case of motion-compensated prediction, a motion vector may be signaled for block 46 within data stream 14 to the decoder as prediction parameter. Likewise, an extrapolation direction may be signaled within data stream 14 to the decoder for block 46 in case of spatial prediction as prediction parameter.

That is, the prediction provider 16 outputs a predicted filling of predetermined block 46. The predicted filling is illustrated in FIG. 1 at 48. It is actually the first version 48 of this predicted filling as it will be "improved" by the subsequent sequence of components 18, 20 and 22 as explained further below. That is, prediction provider 16 predicts a predicted sample value for each sample 50 within block 46, this predicted filling representing the first version 48.

As depicted in FIG. 1, block 46 may be rectangular or even quadratic. However, this is merely an example and should not be treated as limiting alternative embodiments of the present application.

The spectral decomposer is configured to spectrally decompose a region 52 composed of the first version 48 of predicted filling for block 46 and an extension thereof, namely a previously encoded version of a neighborhood 54 of block 46. That is, geometrically, spectral decomposer 20 performs a spectral decomposition onto a region 52 comprising, in addition to block 46, a neighborhood 54 of block 46, with the portion of region 52 corresponding to block 46, being filled with the first version 48 of a predicted filling of block 46, and the neighborhood 54 being filled with the sample values being reconstructable from data stream 14 at the decoding side. Spectral decomposer 18 receives the predicted filling 48 from prediction provider 16 and receives the reconstructed sample values for neighborhood 54 from the reconstruction stage 34.

FIG. 2 illustrates, for instance, that picture 12 is coded into data stream 14 by apparatus 10 according to a certain coding/decoding order 58. This coding order may, for instance, traverse picture 12 from an upper left corner to a lower right corner. The traversal may run row-wise as illustrated in FIG. 2, but could alternatively run column-wise or diagonally. However, all these examples are merely illustrative and should also not be treated as being limiting. Owing to this general propagation of the coding/decoding order from top left to bottom right of picture 12, for most prediction blocks 46, the neighborhood of block 46 to the top of or being adjacent to the top side $46_1$ and to the left of or being adjacent to the left-hand side $46_4$ of block 46 has already been encoded into data stream 14 and is already reconstructable from data stream 14 at the decoding side when performing encoding/reconstruction of block 46. Accordingly, in the example of FIG. 2, neighborhood 54 represents a spatial extension of block 46 beyond sides $46_1$ and $46_4$ of block 46, thereby describing an L-shaped area which, together with block 46 results in a rectangular region 52 the lower and right-hand sides of which coincide, or are co-linear to, the left and bottom sides $46_2$ and $46_3$ of block 46.

That is, spectral decomposer 18 performs a spectral decomposition onto a sample array corresponding to region 52 wherein the samples corresponding to neighborhood 54 are the sample values reconstructable from the data stream 14 using their prediction residual coded into the data stream 14 by encoding stage 24, while the samples of region 52 within block 46 are the sample values of the predicted filling 48 of prediction provider 16. The spectral decomposition which spectral decomposer 18 performs onto this region 52, i.e its transform type, may be a DCT, DST or wavelet transform. Optionally, but not exclusively, the transformation $T_2$ used by spectral decomposer 18 may be of the same type as the transformation $T_1$ used by transformer 28 for transforming of the prediction residual as output by subtracter 28 into spectral domain. If they are of the same type, spectral decomposer 18 and transformer 28 may share certain circuitry and/or computer code responsible for, or designed for, performing transformations of that type. However, the transformations performed by spectral decomposer 18 and transformer 28 may alternatively by different.

The output of spectral decomposer 18 is, thus, a first spectrum 60. Spectrum 60 may be an array of spectral coefficients. For instance, the number of spectral coefficients may be equal to the number of samples within region 52. The spatial frequency to which the spectral components belong may increase column-wise from left to right as far as spatial frequencies along the horizontal axis x are concerned, and from top to bottom as far as spatial frequencies within region 52 along the y axis are concerned. However, it should be noted that the $T_2$ may alternarively to the above examples be "overcomplete", so that the number of transform coefficients resulting from $T_2$ may even be larger than the number of samples within region 52.

Noise reducer 20 then performs a noise reduction onto spectrum 60 to obtain a second, or noise-reduced spectrum 62. An example as to how the noise reduction by noise reducer 20 may be performed, will be provided in the following. In particular, noise reduction 20 may involve a thresholding of the spectral coefficients. Spectral coefficients lower than a certain threshold value may be either set to zero, or may be shifted towards zero by an amount equal to the threshold. However, all these examples are merely illustrative and many alternatives exist with respect to performing noise reduction on spectrum 60 to result into spectrum 62.

Spectral composer 22 then performs the inverse of the spectral decomposition performed by spectral decomposer 18. That is, the inverse transformation is used by spectral composer 22 compared to spectral decomposer 18. As a result of the spectral composition, which may alternatively be called synthesis, spectral composer 22 outputs the second version of a predicted filling for block 46 indicated by hatching at 64 in FIG. 1. It is to be understood, that the spectral composition of composer 22 results in a modified version of whole region 52. As indicated, however, by different hatchings for block 46 on the one hand and neighborhood 54 on the other hand, merely the portion corresponding to block 46 is of interest and forms the second version of the predicted filling of block 46. It is indicated by cross-hatching in FIG. 1. The spectral composition of region 52 within neighborhood 54 is illustrated in FIG. 1 using simple hatching and may not even be computed by spectral composer 22. It is briefly noted here, that the "inversity" may already be fulfilled when the spectral decomposition $T_2^{-1}$ performed by spectral composer 22 is left inverse of $T_2$, i.e. $T_2^{-1} \cdot T_2 = 1$. That is, two-sided inversity is not necessary. For example, in addition to the above transformation examples, $T_2$ may be a shearlet or contourlet transformation. Whatever transformation type is used for $T_2$, it is advantageous if all basis functions of $T_2$ extend over the whole region 52, or if all basis functions cover at least a large fraction of region 52.

Notably, owing to the fact that spectrum 62 has been obtained by transforming, noise reducing and retransforming region 52 which also coveres an already encoded and, as far as the decoding side in concerned, reconstructable version, the second version 64 of the predicted filling likely results in a lower prediction error and may, thus, represent an improved predictor for finally coding block 46 into data stream 14 by encoding stage 24, i.e. for performing the residual coding.

As already mentioned above, selector 42 may optionally be present in encoder 10. If not present, the second version 64 of predicted filling of block 46 inevitably represents the final predictor of block 46 entering the inverting input of subtracter 26 which, accordingly, computes the prediction residual or the prediction error by subtracting the final predictor from the actual content of picture 12 within block 46. Encoding stage 24 then transforms this prediction residual into spectral domain where quantizer 30 performs quantization onto the respective spectral coefficients which represent this prediction residual. The entropy encoder 32, inter alias, entropy-encodes these quantized coefficient levels into data stream 14. As already mentioned above, owing to the coding/decoding order 58, the spectral coefficients concerning the prediction residual within the neighborhood 54 are already present within data stream 14, prior to the prediction of block 46. The quantizer 36 and inverse transformer 28 recover the prediction residual of block 46 in a version also reconstructable at the decoding side and adder 40 adds this prediction residual to the final predictor, thereby revealing the reconstructed version of already encoded portions which, as already stated above, also include neighborhood 54, i.e. comprise the reconstructed version 56 of neighborhood 54 using which the portion of region 52 is populated which is then subject to spectral decomposition by a spectral decomposer 18.

If, however, optional selector 42 is present, then selector 42 may perform a selection between the first version 48 and the second version 64 of predicted filling for block 46 and use either one of these two versions as the final predictor entering the inverting input of subtracter 26 and the respective input of adder 40, respectively.

The manner at which the second or improved version 64 of the predicted filling for block 46 is derived by blocks 18 to 22 and the optional selection 42 may be parametrizable for encoder 10. That is, encoder 10 may parametrize this manner with respect to one or more of the following options, with the parametrization being signaled to the decoder by way of a respective signalization. For instance, encoder 10 may decide on selecting version 48 or 64 and signal the result of the selection by way of a signalization 70 in the data stream. Again, the granularity at which the selection 70 is performed, may be a sub-picture granularity and may, for instance, be done in areas or blocks into which picture 12 is subdivided. In particular, encoder 10 may perform the selection for each prediction block such as block 46 individually and signal the selection by way of signalization 70 in data stream 14 for each such prediction block. A simple flag may be signaled for each block such as block 46 in data stream 14. Spatial prediction may be used so as to code signalization 70 in the data stream 14. For example, the flag may be spatially predicted on the basis of signalization 70 contained in data stream 14 for neighboring blocks in neighboring block 46. Additionally or alternatively, context-adaptive entropy coding may be used in order to code signalization 70 into the data stream. The context used to entropy code signalization 70 for a certain block 46 into data stream 14 may be determined on attributes contained in the data stream 14 for neighboring block 46, such as the signalization 70 signaled in data stream 14 for such neighboring blocks.

Additionally or alternatively, a further parametrization option for encoder 10 might be the size of region 52 or, alternatively speaking, the size of neighborhood 54. For example, encoder 10 may set a position of the corner of region 52 which is opposite to the corner 74 of block 46 co-located to the corresponding corner of block 46. Signalization 72 may indicate the position of this corner 76, or the size of region 52, respectively, by way of an index into a list of available corner positions or sizes, respectively. The corner positions may be indicated relative to the upper left corner of block 46, i.e. as a vector relative to a corner of block 46 opposite to the corner shared among region 52 and block 46. The setting of the size of region 52 may be done by apparatus 10 also at a sub-picture granularity such as areas or blocks into which picture 12 is subdivided, wherein these areas or blocks may coincide with the prediction block, i.e. encoder 10 may perform the setting of the size of region 52 for each block 46 individually. Signalization 72 may be coded into data stream 14 using predictive coding as explained with respect to signalization 70, and/or using context-adaptive entropy coding using a spatial context similar to signalization 70.

Alternatively or additionally to signalizations 70 and 72, apparatus 10 may also be configured to determine a strength of the noise reduction performed by noise reducer 20. For instance, by way of a signalization 78 (FIG. 3) apparatus 10 may signal a determined or chosen strength.

Figure 3:
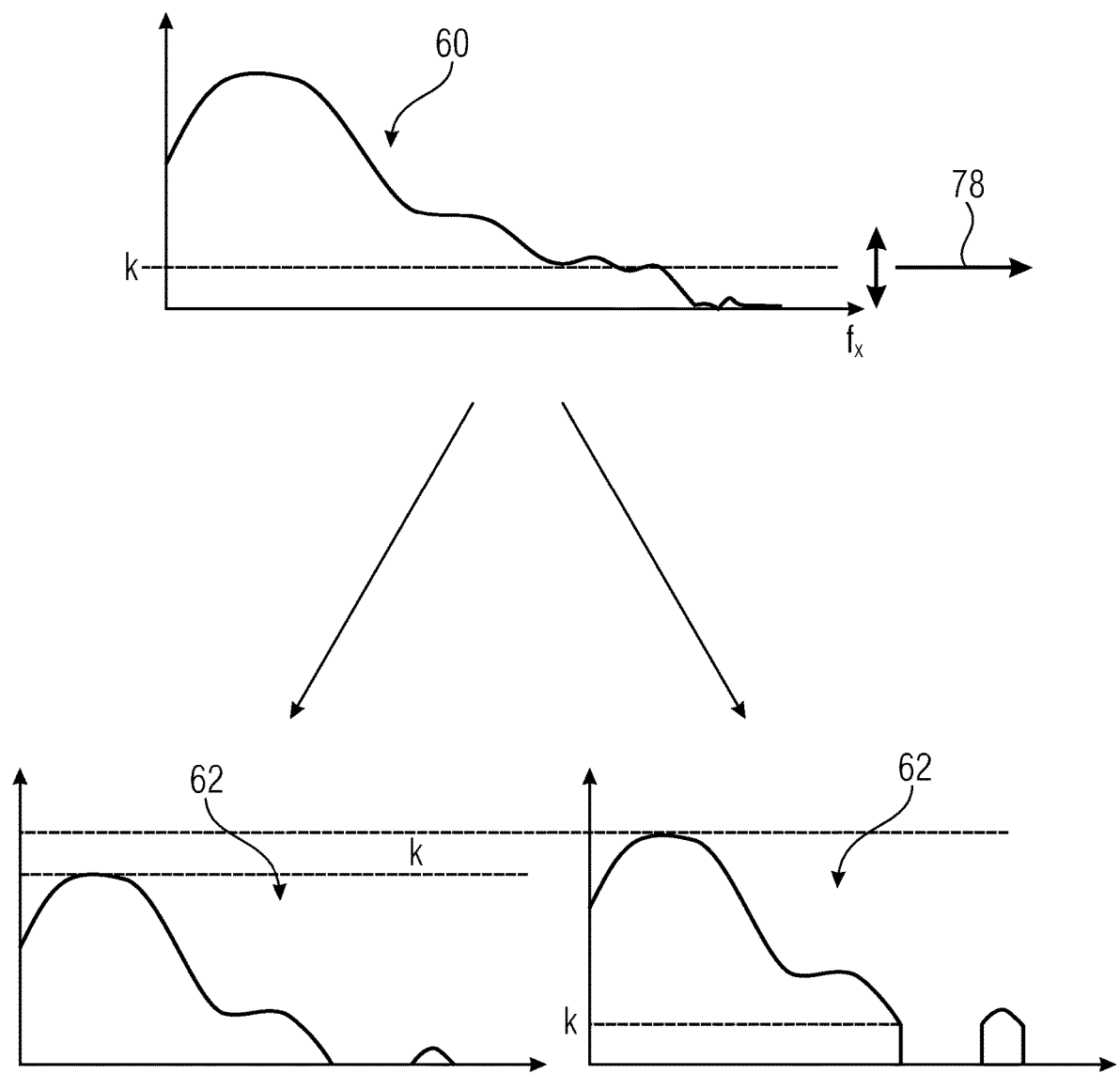
FIG. 3 shows a schematic diagram illustrating noise reduction in accordance with an embodiment with, in particular, illustrating two alternative ways of performing this noise reduction using a threshold.
Figure 4:
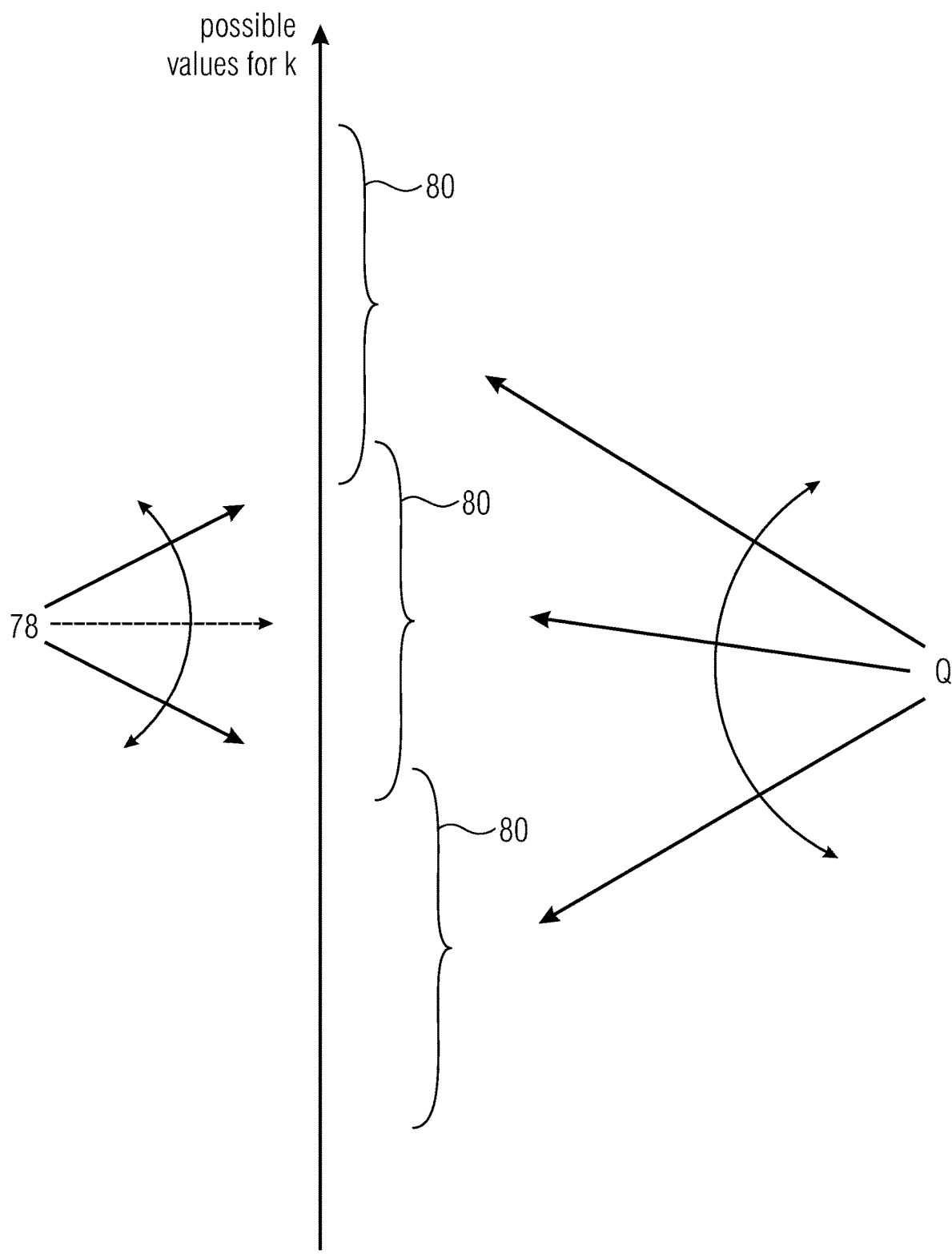
FIG. 4 shows a schematic diagram illustrating a selection among possible noise reduction strength in accordance with an embodiment.

For instance, signalization 78 may indicate a threshold $\kappa$ which is also mentioned in the more mathematically presented implantation example described herein below. FIG. 3 illustrates that noise reducer 20 may use this threshold $\kappa$ so as to set all spectral components or coefficients of spectrum 60 succeeding $\kappa$ to zero so as to result into spectrum 62, or clip the spectrum 60 below the threshold $\kappa$ and collapse, or shifting to zero, the portion of spectrum 60 exceeding threshold $\kappa$ so as to start from zero as illustrated in FIG. 3. The same as indicated above with respect to signalizations 70 and 72 holds true for signalization 78. That is, apparatus 10 may conduct the setting of the noise reduction strength or the threshold $\kappa$ picture-globally or sub-picture granularly. In the latter case, encoder 10 may optionally perform the setting for each block 46 individually. In accordance with a specific embodiment illustrated with respect to FIG. 4, encoder 10 may select the noise reduction strength or threshold $\kappa$ out of a set of possible values for $\kappa$ which set is itself selected out of a plurality of sets 80. The selection among sets 80 may be performed based on the quantization parameter Q on the basis of which quantizer 30 performs the quantization and dequantizer 36 performs the dequantization of the prediction residual signal. The selection of the actual noise reduction strength or threshold $\kappa$ to be actually used among the possible values for $\kappa$ in the selected set 80 is then signaled by signalization 78. It should be understood that quantization parameter Q may be signaled in the data stream 14 at a granularity differing from the granularity at which signalization 78 is signaled in data stream 14. For instance, quantization parameter Q may be signaled in data stream 14 on a slice basis or picture basis while signalization 78 may, as just outlined, be signaled in data stream 14 for each block 46. Similar to the above comments, signalization 78 may be conveyed within data stream using predictive coding and/or context-adaptive entropy coding using a spatial context.

Figure 5:
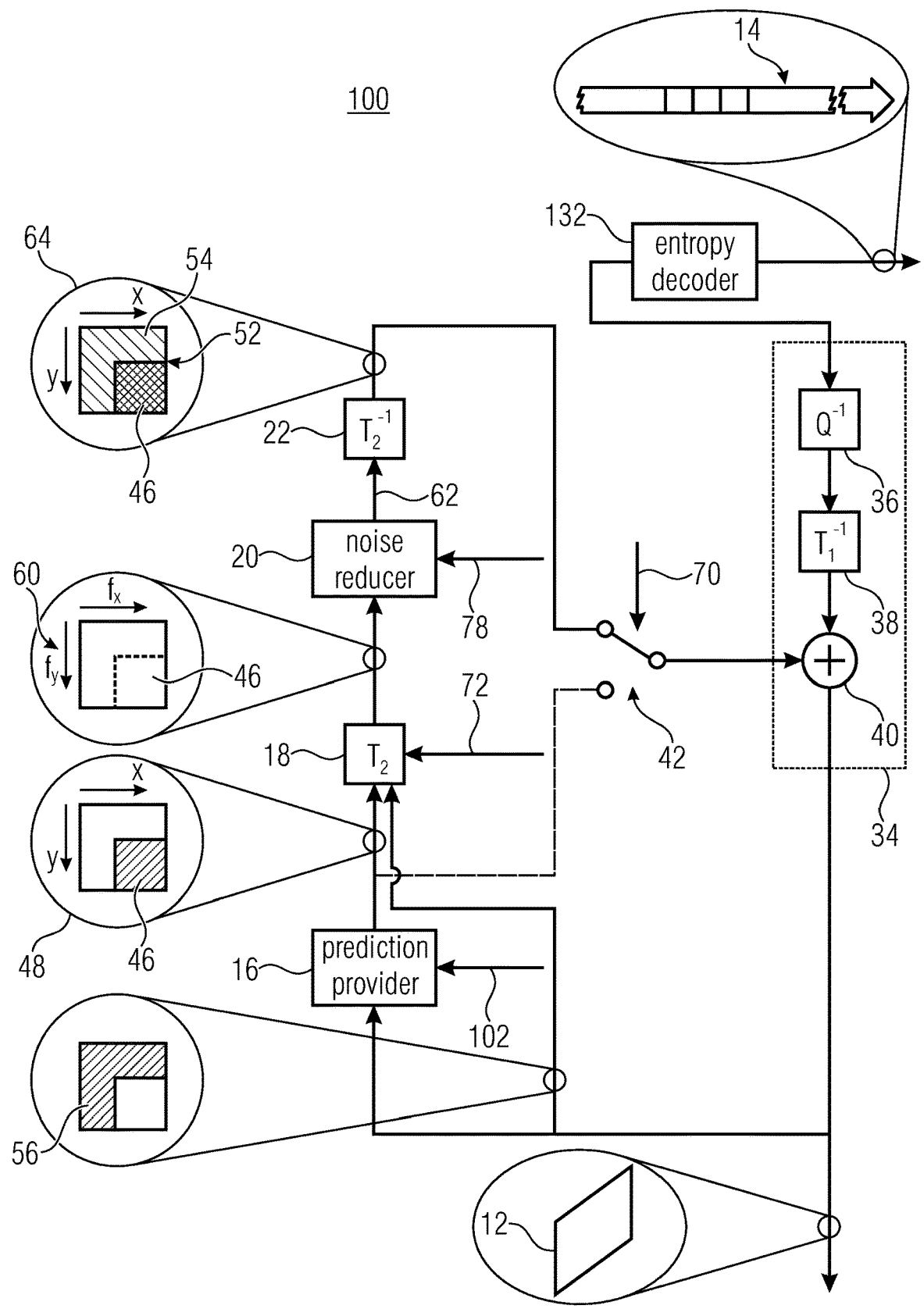
FIG. 5 shows a block diagram of a decoding apparatus fitting to the apparatus of FIG. 1 in accordance with an embodiment.

FIG. 5 shows an apparatus for block-based predictive decoding picture 12, a reconstructed version of picture 12, from data stream 14 which fits to the apparatus of FIG. 1. Largely, the internal structure of decoder 100 of FIG. 5 coincides with the internal structure of encoder 10 as far as their task with respect to those coding parameters is concerned, which were finally selected by apparatus 10 of FIG. 1. Accordingly, FIG. 5 shows that apparatus 100 of FIG. 5 comprises a prediction loop into which components 40, 16, 18, 20, 22 and optional signal 42 are serially connected in the manner shown and described above with respect to FIG. 1. As the reconstructed portions of the signal to be reconstructed, i.e. the picture 12, results at the output of adder 40, this output represents output of the decoder 100. Optionally, picture improving modules, such as post-filters could be positioned in front of the output.

It should be taken into account that whenever the apparatus 10 has the freedom to select a certain coding parameter, apparatus 10 selects this coding parameter for maximizing, for instance, a certain optimization criterion such as, for instance, a rate/distortion cost measure. Signalization in the data stream 14 is then used to keep predictions performed by encoder 10 and decoder 100 synchronized. The corresponding modules or components of decoder 100 may be controlled by a respective signalization included into data stream 14 by encoder 10 and signalizing the chosen coding parameter. For instance, prediction provider 16 of decoder 100 is controlled via coding parameters in data stream 14. These coding parameters indicate the prediction mode, for instance, and the prediction parameters for the indicated prediction mode, for instance. The coding parameters are chosen by apparatus 10. An example for the prediction parameters 102 have been mentioned above. The same circumstance as just outlined with respect to coding parameters 102 and prediction parameters, respectively, is true with respect to each of signalizations 70, 72 and 78, too, all of which are optional, i.e. either none, one, two or all of same may be present. At the encoding side of apparatus 10, the respective signalization is chosen to optimize some criterion, and the parameter chosen is indicated by way of the respective signalization. The signalization 70, 72 and 78 steers the control of selector 42, which is optional, with respect to the selection among the predicted filling version, the spectral decomposer 18 with respect to the size of region 52, such as via indicating the relative vector to the upper left vertex of region 52, and noise reducer 20 with respect to the strength of noise reduction such as via indicating the threshold to be used. The loop just outlined, into which adder 40 of reconstructor 34 followed by prediction provider 16, spectral decomposer 18, noise reducer 20 and spectral composer 22 and, optionally, selector 42 are serially connected, is continuously fed with new residual data via the other input of adder 40, i.e. the input not connected to selector 42. In particular, an entropy coder 132 performs the inverse of entropy encoder 32, namely same entropy decodes the residual signal in spectral domain, namely the coefficient levels, from data stream 14 in a manner so that same pertain to blocks 46 serially along the above-mentioned coding/decoding order 58. An entropy decoder 132 forwards these coefficient levels to reconstruction stage 34 which dequantizes the coefficient levels in dequantizer 36 and transforms same to spatial domain by inverse transformer 38 whereupon the thus obtained residual signal is added to the final prediction signal which is the second version 64 or the first version 48 of predicted filling.

Summarizing the above, decoder 100 has access to the same information basis for performing the prediction by prediction provider 16 and has already reconstructed the samples within the neighborhood 54 of the currently predicted block 46 using the prediction signal gained from data stream 14 via the sequence of blocks 32, 36 and 38. If present, signalizations 70, 78 and 72 allow a synchrony between encoder and decoder 100. As outlined above, decoder 100 may be configured to vary the corresponding parameter, namely the selection by selector 42, the size of region 52 at spectral decomposer 18 and/or the noise reduction strength in noise reducer 20, at sub-picture granularity which granularity may, as already set out above, be different among these parameters. Decoder 100 varies these parameters at this granularity since the signalization 70, 72 and/or 78 is signaled in data stream 14 at that granularity. As outlined above, spatial decoding may be used by apparatus 100 to decode any of signalization 70, 72 and 78 from data stream 14. Additionally or alternatively, context-adaptive entropy decoding using a spatial context may be used. Further, with respect to signalization 78, i.e. the signalization controlling the noise reduction 20, apparatus 100 may be configured to, as outlined above with respect to FIG. 4, select one of several subsets of possible noise reduction strengths on the basis of a quantization parameter Q which apparatus 100 determines from the data stream 14 for an area which a currently predicted block 46 is located in, and then determines the noise reduction strength to be actually used for noise reduction for block 46 on the basis of signalization 78 which selects one out of the pre-selected set of possible noise reduction strengths. For example, each set 80 may comprise eight possible noise reduction strengths. As there are more than one set 80 select, the overall number of possible noise reduction strengths covered by all sets 80 may be eight times the number of sets 80. However, sets 80 may overlap, i.e some possible noise reduction strengths may be member of more than one set 80. Naturally, eight has been used here merely as an example and the number of possible noise reduction strengths per set 80 may be different than eigth and my even vary among sets 80.

Many variations are possible with respect to the above-outlined embodiments. For instance, encoding stage 24 and reconstruction stage 34 do not need to be transform-based. That is, the prediction residual may be coded in data stream 14 in a manner other than using the spectral domain. Further, possibly, the concept may work lossless. As described before with respect to the relationship between decomposer 18 and transformer 38, the inverse transformation by inverse transformer 38 may be the same, in type, as the transformation performed by composer 22.

The above concept may be implemented in a manner so as to result in a non-linear transform domain based prediction relying on an initial predictor and surrounding reconstructed samples.

The concept outlined above may be used to generate a prediction signal in video coding. The principle underlying this concept may in other words be described as follows. In a first step, a picture or video decoder generates a starting prediction signal as in some underlying picture or video compression standard, e.g. by motion compensation or intra or spatial picture prediction. In the second step, the decoder proceeds in the following steps. First, it defines an extended signal which consists of a combination of the prediction signal and the already reconstructed signal. Then, the decoder applies a linear analysis transform to the extended prediction signal. Next, the decoder applies a, for example, non-linear thresholding to the transformed extended prediction signal. In the final step, the decoder applies a linear synthesis transform to the result of the previous step and replaces the starting prediction signal by the result of the synthesis transform, restricted to the domain of the prediction signal.

In the next section, we give a more mathematically presented explanation of the concept as an implementation example.

We consider, as an example, a hybrid video coding standard in which for each color component cmp the content of a video-frame on a block 46 (FIG. 2)

$B_{cmp} := \{(x, y) \in \mathbb{Z}^2: k_{1,cmp} \leq x < k_{2,cmp}; I_{1,cmp} \leq y < I_{2,cmp}\}$, where $k_{1,cmp}, k_{2,cmp}, I_{1,cmp}, I_{1,cmp} \in \mathbb{Z}$ with $k_{1,cmp} < k_{2,cmp}$ and $I_{1,cmp} < I_{2,cmp}$, is to be generated by a decoder. For every color component cmp, the latter content is given by a function $im_{cmp}: B_{cmp} \to \mathbb{R}$.

We assume that the hybrid video coding standard operates by predictive coding on the current block $B_{cmp}$.

By this we mean that, as part of the standard, for every component cmp the decoder constructs a prediction signal, 48 in FIG. 2, $pred_{cmp}: B_{cmp} \to \mathbb{R}$ in a way that is determined uniquely by the already decoded bitstream. This prediction signal can for example be generated by intra-picture prediction or by motion compensated prediction. We apply for copyright for the following extension of this predictive coding and thus for the following generation of a new prediction signal $pred_{cmp}$.

1. The standard is changed such that from the bitstream, the decoder can determine for every component cmp that exactly one of the following two options is true:
   (i) Option one: The new prediction method is not applied.
   (ii) Option two: The new prediction method is applied.
2. The standard is changed such that if the decoder has determined in step one that Option Two is true for a given component cmp, it is possible for the decoder to determine from the bitstream the following data:
   (i) Unique integers $k'_{1,cmp}, l'_{1,cmp} \in \mathbb{Z}$ with $k'_{1,cmp} < k_{1,cmp}$ and $l'_{1,cmp} < l_{1,cmp}$ such that on the block or L-shaped neighborhood 54 (FIG. 2) $B_{rec,cmp} := \{(x,y) \in \mathbb{Z}^2 | (k'_{1,cmp} \leq x < k_{1,cmp} \land l'_{1,cmp} \leq y < l_{2,cmp}) \lor (k'_{1,cmp} \leq x < k_{2,cmp} \land l'_{1,cmp} \leq y < l_{1,cmp})\}$, the already constructed image $rec_{cmp}: B_{rec,cmp} \to \mathbb{R}$ is available to the decoder. $k'_{1,cmp}$, $l'_{1,cmp}$ define the size of neighborhood 54 and may be signaled by 72.
   (ii) A unique integer $\in \mathbb{N}$, a unique analysis transform T, which is a linear map $T: \mathbb{R}^{(k_{2,cmp}-k'_{1,cmp}) \cdot (l_{2,cmp}-l'_{1,cmp})} \to \mathbb{R}^N$ And a unique synthesis transform S, which is a linear map $S: \mathbb{R}^N \to \mathbb{R}^{(k_{2,cmp}-k'_{1,cmp}) \cdot (l_{2,cmp}-l'_{1,cmp})}$ S is 60 in FIGS. 1 and 5. For example, T can be the discrete cosine or the discrete sine transform, in which case $N=(k_{2,cmp}-k'_{1,cmp}) \cdot (l_{2,cmp}-l'_{1,cmp})$ and $S=T^{-1}$. However, also overcomplete tranforms may be used, in which case $N > (k_{2,cmp}-k'_{1,cmp}) \cdot (l_{2,cmp}-l'_{1,cmp})$
   (iii) A unique Threshold $\kappa \in (0, \infty)$ and a unique thresholding operator $\theta_\kappa: \mathbb{R}^N \to \mathbb{R}^N$, which is either given as the Hard Thresholding Operator with threshold $\kappa, \theta_\kappa = \theta_\kappa^H$, where $\theta_\kappa^H$ is defined by $$(\Theta_\kappa^H(x))_i = \begin{cases} x_i, & \text{if } |x_i| > \kappa \\ 0, & \text{else} \end{cases}$$

Or as the Soft Thresholding Operator with threshold k, $\theta_\kappa = \theta_\kappa^S$, where $\theta_\kappa^S$ is defined by $$(\Theta_\kappa^S(x))_i = \begin{cases} x_i - \kappa, & \text{if } x_i > \kappa \\ 0, & \text{if } |x_i| \leq \kappa \\ x_i + \kappa, & \text{if } x_i < -\kappa \end{cases}$$

Here $x = (x_1, \ldots, x_i, \ldots x_N) \in \mathbb{R}^N$. The thresholding may be done as part of noise reduction 20 in FIGS. 1 and 5 and $\kappa$ be signaled by 78.

For example, the underlying codec can be changed such that the parameters introduced in the last three items can be determined by the decoder from the current bitstream as follows. The decoder determines an index from the current bitstream and using this index the decoder determines the integers $k'_{1,cmp}$ and $l'_{1,cmp}$, the transforms T and S as well as the threshold $\kappa$ and the specific thresholding operator from a predefined lookup table. The latter lookup table might depend on some additional parameters that are already available to the decoder, for example the quantization parameter. That is, in addition to, or alterntive to, 70, 72 and 78, there may be a signalization to vary the transform and the inverse thereof used by composer 22 and decomposer 18. The signalization and variation may be done picture-globally or sub-picture granularly, and using spatial prediction and/or using entropy coding/decoding using a spatial context.

3. The standard is changed such that if the decoder has determined in step one that Option Two is true for a given component cmp, the decoder extends the block $B_{cmp}$ to the larger block $B_{cmp,ext} := \{(x, y) \in Z^2: k'_{1,cmp} \leq x < k_{2,cmp}; l'_{1,cmp} \leq y < l_{2,cmp}\}$, where $k'_{1,cmp}, l'_{1,cmp}$ are as in Step two, and defines an extended prediction signal $$pred_{cmp,ext}: B_{cmp,ext} \to \mathbb{R} \text{ by}$$

$$pred_{cmp,ext}(x, y) = \begin{cases} rec_{cmp}(x, y), & \text{if } (x, y) \in B_{rec,cmp} \\ pred_{cmp}(x, y), & \text{else} \end{cases},$$

where $B_{rec,cmp}$ and $rec_{cmp}$ are as in Step two. The signal $pred_{cmp,ext}$ can be canonically regarded as a vector in $\mathbb{R}^{(k_{2,cmp}-k'_{1,cmp}) \cdot (l_{2,cmp}-l'_{1,cmp})}$.

Next, the decoder defines a new prediction signal, 64 in FIGS. 1 and 5, $\widetilde{pred}_{cmp}: B_{cmp} \to \mathbb{R}$ by $\widetilde{pred}_{cmp}(x, y) := S(\Theta_\kappa(T(pred_{cmp,ext})))(x, y), \forall (x, y) \in B_{cmp}$, where the analysis transform T, the threshold κ, the thresholding operator $\Theta_\kappa$, and the synthesis transform S are as in Step two.

4. The normal codec is changed such that if the decoder has determined in step one that Option Two is true for a given component cmp, the decoder replaces the prediction signal $pred_{cmp}$ by $\widetilde{pred}_{cmp}$ where $\widetilde{pred}_{cmp}$ is as in the previous step. A signalization 70 may be used, as shown in FIGS. 1 and 5.

As already mentioned above, the codec needs not to be a video codec.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded picture (or video) signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for block-based predictive decoding of a picture, comprising:
   a prediction provider configured to predict a predetermined block of the picture to acquire a first version of a predicted filling of the predetermined block;
   a spectral decomposer configured to spectrally decompose a region composed of the first version of the predicted filling of the predetermined block and a reconstructed version of a neighborhood of the predetermined block so as to acquire a first spectrum of the region;
   a noise reducer configured to perform noise reduction on the first spectrum to acquire a second spectrum;
   a spectral composer configured to subject the second spectrum to spectral composition so as to acquire a modified version of the region including a second version of the predicted filling of the predetermined block;
   a reconstructor configured to decode a reconstructed version of the predetermined block from a data stream on the basis of the second version of the predicted filling,
   wherein the reconstructor is configured to decode a first residual signal from the data stream and correct a prediction signal for the neighborhood using the first residual signal to obtain the reconstructed version of the neighborhood of the predetermined block, and decode a second residual signal from the data stream and correct the second version of the predicted filling of the predetermined block using the second residual signal to obtain the reconstructed version of the predetermined block.

2. The apparatus according to claim 1, wherein the prediction provider is configured to predict the predetermined block using spatial and/or temporal prediction.

3. The apparatus according to claim 1, wherein the spectral decomposer is configured such that the neighborhood of the predetermined block is a spatial extension of the predetermined block beyond a contiguous half of a circumference of the predetermined block.

4. The apparatus according to claim 1, wherein the predetermined block is rectangular and the circumference of the predetermined block comprises a first, second, third and fourth side sequentially arranged along the circumference of the predetermined block clock-wise, wherein the contiguous half comprises the first and fourth sides.

5. The apparatus according to claim 4, wherein the region is rectangular and the circumference of the region includes the second and third sides of the predetermined block.

6. The apparatus according to claim 1, wherein the spectral decomposer and the spectral composer are configured such that the spectral decomposition and the spectral composition are mutually inverse with the spectral decomposition being a DST, DCT or wavelet transform.

7. The apparatus according to claim 1, wherein the noise reducer is configured to subject the first spectrum to thresholding.

8. The apparatus according to claim 1, wherein the reconstructor is configured to decode a residual signal from the data stream and correct the second version of the predicted filling of the predetermined block using the residual signal.

9. The apparatus according to claim 8, wherein the reconstructor is configured to decode the residual signal from the data stream in a spectral domain, transform the residual signal into spatial domain and perform the correction in the spatial domain.

10. The apparatus according to claim 9, wherein the reconstructor is configured to perform the transforming of the residual signal using a transform type also used by the spectral composer for the spectral composition.

11. The apparatus according to claim 1, wherein the reconstructor is configured to switch between using the first version of the predicted filling and the second version of the predicted filling depending on a first signalization in the data stream.

12. The apparatus according to claim 11, wherein the apparatus is configured to decode the first signalization from the data stream at sub-picture granularity.

13. The apparatus according to claim 11, wherein the apparatus is configured to decode the first signalization from the data stream using spatial prediction and/or using entropy decoding using a spatially depending context.

14. The apparatus according to claim 1, wherein the spectral decomposer is configured to set a size of the neighborhood depending on a second signalization in the data stream.

15. The apparatus according to claim 14, wherein the apparatus is configured to decode the second signalization from the data stream at sub-picture granularity.

16. The apparatus according to claim 14, wherein the apparatus is configured to decode the second signalization from the data stream using spatial prediction and/or using entropy decoding using a spatially depending context.

17. The apparatus according to claim 1, wherein the noise reducer is configured to set a strength of the noise reduction depending on a third signalization in the data stream.

18. The apparatus according to claim 17, wherein the apparatus is configured to decode the third signalization from the data stream at sub-picture granularity.

19. The apparatus according to claim 17, wherein the apparatus is configured to decode the third signalization from the data stream using spatial prediction and/or using entropy decoding using a spatially depending context.

20. The apparatus according to claim 17, wherein the apparatus is configured to, in setting a strength of the noise reduction, select a set of possible strengths on the basis of a quantization parameter applied by the reconstructor for reconstructing the predetermined block from the data stream and perform the setting so that the strength is set to one of the set of possible strengths by using the third signalization as an index into the selected set of possible strengths.

21. An apparatus for block-based predictive encoding of a picture, comprising:
   a prediction provider configured to predict a predetermined block of the picture to acquire a first version of a predicted filling of the predetermined block;
   a spectral decomposer configured to spectrally decompose a region composed of the first version of the predicted filling of the predetermined block and a previously encoded version of a neighborhood of the predetermined block so as to acquire a first spectrum of the region;

a noise reducer configured to perform noise reduction on the first spectrum to acquire a second spectrum;

a spectral composer configured to subject the second spectrum to spectral composition so as to acquire a modified version of the region including a second version of the predicted filling of the predetermined block;

an encoding stage configured to encode the predetermined block into a data stream on the basis of the second version of the predicted filling, wherein the encoding stage is configured to encode a first residual signal into the data stream which corrects a prediction signal for the neighborhood to obtain the previously encoded version of the neighborhood of the predetermined block, and encode a second residual signal into the data stream which corrects the second version of the predicted filling of the predetermined block to obtain an encoded version of the predetermined block.

22. The apparatus according to claim 21, wherein the prediction provider is configured to predict the predetermined block using spatial and/or temporal prediction.

23. The apparatus according to claim 21, wherein the spectral decomposer is configured such that the neighborhood of the predetermined block is a spatial extension of the predetermined block beyond a contiguous half of a circumference of the predetermined block.

24. The apparatus according to claim 21, wherein the predetermined block is rectangular and the circumference of the predetermined block comprises a first, second, third and fourth side sequentially arranged along the circumference of the predetermined block clock-wise, wherein the contiguous half comprises the first and fourth sides.

25. The apparatus according to claim 24, wherein the region is rectangular and the circumference of the region comprises the second and third sides of the predetermined block.

26. The apparatus according to claim 21, wherein the spectral decomposer and the spectral composer are configured such that the spectral decomposition and the spectral composition are mutually inverse with the spectral decomposition being a DST, DCT or wavelet transform.

27. The apparatus according to claim 21, wherein the noise reducer is configured to subject the first spectrum to thresholding.

28. The apparatus according to claim 21, wherein the encoding stage is configured to encode a residual signal into a data stream, the residual signal correcting a prediction error of the second version of the predicted filling of the predetermined block.

29. The apparatus according to claim 28, wherein the encoding stage is configured to determine the prediction error in spatial domain, transform the prediction error into spectral domain and encode the residual signal into the data stream in the spectral domain.

30. The apparatus according to claim 29, wherein the encoding stage is configured to perform the transforming of the residual signal using a transform type also used by the spectral decomposer for the spectral decomposition.

31. The apparatus according to claim 21, wherein the encoding stage is configured to select between using the first version of the predicted filling and the second version of the predicted filling and signal the selection by way of a first signalization in the data stream.

32. The apparatus according to claim 31, wherein the apparatus is configured to perform the selection and encode the first signalization into the data stream at sub-picture granularity.

33. The apparatus according to claim 32, wherein the apparatus is configured to encode the first signalization into the data stream using spatial prediction and/or using entropy encoding using a spatial context.

34. The apparatus according to claim 21, configured to set a size of neighborhood and signalize the size by way of a second signalization in a data stream.

35. The apparatus according to claim 34, wherein the apparatus is configured to perform the setting and encode the second signalization into the data stream at sub-picture granularity.

36. The apparatus according to claim 34, wherein the apparatus is configured to encode the second signalization into the data stream using spatial prediction and/or using entropy encoding using a spatial context.

37. The apparatus according to claim 21, configured to set a strength of the noise reduction and signalize the strength by way of a third signalization in the data stream.

38. The apparatus according to claim 37, wherein the apparatus is configured to perform the setting of the strength and encode the third signalization into the data stream at sub-picture granularity.

39. The apparatus according to claim 37, wherein the apparatus is configured to encode the third signalization into the data stream using spatial prediction and/or using entropy encoding using a spatial context.

40. The apparatus according to claim 37, wherein the apparatus is configured to, in setting a strength of the noise reduction, select a set of possible strengths on the basis of a quantization parameter applied by encoding stage for encoding the predetermined block into the data stream and perform the setting so that the strength is set to one of the set of possible strengths and the third signalization indicates an index into the selected set of possible strengths.

41. A method for block-based predictive decoding of a picture, comprising:

predicting a predetermined block of the picture to acquire a first version of a predicted filling of the predetermined block;

spectrally decomposing a region composed of the first version of the predicted filling of the predetermined block and a reconstructed version of a neighborhood of the predetermined block so as to acquire a first spectrum of the region;

performing noise reduction on the first spectrum to acquire a second spectrum;

subjecting the second spectrum to spectral composition so as to acquire a modified version of the region including a second version of the predicted filling of the predetermined block;

decoding a reconstructed version of the predetermined block from a data stream on the basis of the second version of the predicted filling, wherein a first residual signal is decoded from the data stream and a prediction signal for the neighborhood is corrected using the first residual signal to obtain the reconstructed version of the neighborhood of the predetermined block, and a second residual signal is decoded from the data stream and the second version of the predicted filling of the predetermined block is corrected using the second residual signal to obtain the reconstructed version of the predetermined block.

42. A method for block-based predictive encoding of a picture, comprising:
- predicting a predetermined block of the picture to acquire a first version of a predicted filling of the predetermined block;
- spectrally decomposing a region composed of the first version of the predicted filling of the predetermined block and a previously encoded version of a neighborhood of the predetermined block so as to acquire a first spectrum of the region;
- performing noise reduction on the first spectrum to acquire a second spectrum;
- subjecting the second spectrum to spectral composition so as to acquire a modified version of the region including a second version of the predicted filling of the predetermined block;
- encoding the predetermined block into a data stream on the basis of the second version of the predicted filling,
- wherein a first residual signal is encoded into the data stream which corrects a prediction signal for the neighborhood to obtain the previously encoded version of the neighborhood of the predetermined block, and a second residual signal is encoded into the data stream which corrects the second version of the predicted filling of the predetermined block to obtain an encoded version of the predetermined block.

43. A non-transitory digital storage medium having a computer program stored thereon to perform the method for block-based predictive decoding of a picture, the method comprising:
- predicting a predetermined block of the picture to acquire a first version of a predicted filling of the predetermined block;
- spectrally decomposing a region composed of the first version of the predicted filling of the predetermined block and a reconstructed version of a neighborhood of the predetermined block so as to acquire a first spectrum of the region;
- performing noise reduction on the first spectrum to acquire a second spectrum;
- subjecting the second spectrum to spectral composition so as to acquire a modified version of the region including a second version of the predicted filling of the predetermined block;
- decoding a reconstructed version of the predetermined block from a data stream on the basis of the second version of the predicted filling, when said computer program is run by a computer,
wherein a first residual signal is decoded from the data stream and a prediction signal for the neighborhood is corrected using the first residual signal to obtain the reconstructed version of the neighborhood of the predetermined block, and a second residual signal is decoded from the data stream and the second version of the predicted filling of the predetermined block is corrected using the second residual signal to obtain the reconstructed version of the predetermined block.

44. A non-transitory digital storage medium having a computer program stored thereon to perform the method for block-based predictive encoding of a picture, the method comprising:
- predicting a predetermined block of the picture to acquire a first version of a predicted filling of the predetermined block;
- spectrally decomposing a region composed of the first version of the predicted filling of the predetermined block and a previously encoded version of a neighborhood of the predetermined block so as to acquire a first spectrum of the region;
- performing noise reduction on the first spectrum to acquire a second spectrum;
- subjecting the second spectrum to spectral composition so as to acquire a modified version of the region including a second version of the predicted filling of the predetermined block;
- encoding the predetermined block into a data stream on the basis of the second version of the predicted filling, when said computer program is run by a computer,
wherein a first residual signal is encoded into the data stream which corrects a prediction signal for the neighborhood to obtain the previously encoded version of the neighborhood of the predetermined block, and a second residual signal is encoded into the data stream which corrects the second version of the predicted filling of the predetermined block to obtain an encoded version of the predetermined block.

45. A data stream having a picture encoded thereinto, the data stream being generated by a method according to claim 42.

46. The apparatus according to claim 1, wherein the spectral decomposer is configured to spectrally decompose the region so that the spectrum of the region is one of a discrete cosine transform of the region, a discrete sine transform of the region or a wavelet transform of the region.

47. The apparatus according to claim 1, wherein the spectral decomposer is configured to use a two dimensional transform to spectrally decompose the region into a transform coefficient block which consists of transform coefficients which belong to mutually different spectral components and represents the first spectrum of the region wherein a number of transform coefficients of the transform coefficient block is equal to or larger than a number of samples within the region and larger than a number of samples within the predetermined block.

48. The apparatus according to claim 1, wherein the predetermined block is rectangular, the spectral decomposer is configured such that the neighborhood of the predetermined block is a region adjoining outer sides of the predetermined block, and the region is a rectangular region comprising samples of the predetermined block and samples of the L shaped region, and the spectral decomposer is configured to use a two dimensional transform to spectrally decompose the region into a transform coefficient block which consists of transform coefficients which belong to mutually different spectral components and represents the first spectrum of the region wherein a number of transform coefficients of the transform coefficient block is equal to or larger than a number of samples within the region.

49. The apparatus according to claim 1, wherein the predetermined block is rectangular, the spectral decomposer is configured such that the neighborhood of the predetermined block is an L shaped region adjoining an upper and a left-hand side of the predetermined block, and the region is a rectangular region comprising samples of the predetermined block and samples of the L shaped region, and the spectral decomposer is configured to use a two dimensional transform to spectrally decompose the region into a transform coefficient block which consists of transform coefficients which belong to mutually different spectral components and represents the first spectrum of the region wherein a number of transform coefficients of the transform coefficient block is equal to or larger than a number of samples within the region.

50. The apparatus according to claim 1, wherein the neighborhood of the predetermined block is a neighboring region within the picture which spatially adjoins the predetermined block.

51. The apparatus according to claim 50, wherein the spectral decomposer is configured to spectrally decompose the region so that the spectrum of the region is one of a discrete cosine transform of the region, a discrete sine transform of the region or a wavelet transform of the region.

52. The apparatus according to claim 21, wherein the spectral decomposer is configured to spectrally decompose the region so that the spectrum of the region is one of a discrete cosine transform of the region, a discrete sine transform of the region or a wavelet transform of the region.

53. The apparatus according to claim 21, wherein the spectral decomposer is configured to use a two dimensional transform to spectrally decompose the region into a transform coefficient block which consists of transform coefficients which belong to mutually different spectral components and represents the first spectrum of the region wherein a number of transform coefficients of the transform coefficient block is equal to or larger than a number of samples within the region and larger than a number of samples within the predetermined block.

54. The apparatus according to claim 21, wherein the predetermined block is rectangular, the spectral decomposer is configured such that the neighborhood of the predetermined block is a region adjoining outer sides of the predetermined block, and the region is a rectangular region comprising samples of the predetermined block and samples of the L shaped region, and the spectral decomposer is configured to use a two dimensional transform to spectrally decompose the region into a transform coefficient block which consists of transform coefficients which belong to mutually different spectral components and represents the first spectrum of the region wherein a number of transform coefficients of the transform coefficient block is equal to or larger than a number of samples within the region.

55. The apparatus according to claim 21, wherein the predetermined block is rectangular, the spectral decomposer is configured such that the neighborhood of the predetermined block is an L shaped region adjoining an upper and a left-hand side of the predetermined block, and the region is a rectangular region comprising samples of the predetermined block and samples of the L shaped region, and the spectral decomposer is configured to use a two dimensional transform to spectrally decompose the region into a transform coefficient block which consists of transform coefficients which belong to mutually different spectral components and represents the first spectrum of the region wherein a number of transform coefficients of the transform coefficient block is equal to or larger than a number of samples within the region.

56. The apparatus according to claim 21, wherein the neighborhood of the predetermined block is a neighboring region within the picture which spatially adjoins the predetermined block.

57. The apparatus according to claim 52, wherein the spectral decomposer is configured to spectrally decompose the region so that the spectrum of the region is one of a discrete cosine transform of the region, a discrete sine transform of the region or a wavelet transform of the region.

* * * * *